(12) United States Patent
Jennings et al.

(10) Patent No.: US 11,480,057 B2
(45) Date of Patent: Oct. 25, 2022

(54) AIRFOIL COOLING CIRCUIT

(71) Applicant: UNITED TECHNOLOGIES CORPORATION, Farmington, CT (US)

(72) Inventors: Timothy J. Jennings, West Hartford, CT (US); Carey Clum, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 541 days.

(21) Appl. No.: 15/791,745

(22) Filed: Oct. 24, 2017

(65) Prior Publication Data

US 2019/0120064 A1 Apr. 25, 2019

(51) Int. Cl.
| | |
|---|---|
| *F01D 5/18* | (2006.01) |
| *F01D 9/04* | (2006.01) |
| *F01D 25/12* | (2006.01) |
| *F01D 5/20* | (2006.01) |

(52) U.S. Cl.
CPC ............. *F01D 5/186* (2013.01); *F01D 5/187* (2013.01); *F01D 5/20* (2013.01); *F01D 9/041* (2013.01); *F01D 25/12* (2013.01); *F05D 2220/32* (2013.01); *F05D 2230/20* (2013.01); *F05D 2240/12* (2013.01); *F05D 2240/30* (2013.01); *F05D 2260/202* (2013.01)

(58) Field of Classification Search
CPC . F01D 5/186; F01D 5/187; F01D 5/20; F01D 25/12; F01D 9/041; F05D 2220/32; F05D 2230/20; F05D 2240/12; F05D 2240/30; F05D 2260/202
See application file for complete search history.

(56) References Cited

U.S. PATENT DOCUMENTS 2,625,013 A * 1/1953 Howard .................. F01D 9/041
 60/800
3,623,825 A * 11/1971 Schneider ................. F01D 5/18
 416/96 R
(Continued)

FOREIGN PATENT DOCUMENTS

| EP | 3020923 | 5/2016 |
|---|---|---|
| EP | 3216983 | 9/2017 |
| WO | 2014052277 | 4/2014 |

OTHER PUBLICATIONS

European Patent Office, European Search Report dated Mar. 25, 2019 in Application No. 18202133.7.

*Primary Examiner* — David E Sosnowski
*Assistant Examiner* — Wayne A Lambert
(74) *Attorney, Agent, or Firm* — Snell & Wilmer L.L.P.

(57) ABSTRACT

An airfoil may include an airfoil body that defines a skin chamber, a skin chamber outlet opening, and a tip flag chamber. In various embodiments, the skin chamber is in fluidic communication with the tip flag chamber via the skin chamber outlet opening. In various embodiments, the airfoil body further defines an outlet hole disposed on at least one of a trailing edge and a pressure side of the airfoil. The tip flag chamber may be in fluidic communication with the outlet hole (e.g., cooling circuit air in the tip flag chamber may exit the airfoil via the outlet hole). In various embodiments, the tip flag chamber extends parallel and directly adjacent to the outermost tip of the airfoil.

19 Claims, 4 Drawing Sheets

(56) References Cited

U.S. PATENT DOCUMENTS

| | | | | |
|---|---|---|---|---|
| 3,658,439 A * | 4/1972 | Kydd | F01D 5/085 | 416/97 R |
| 3,816,022 A * | 6/1974 | Day | F01D 5/185 | 416/92 |
| 3,844,678 A * | 10/1974 | Sterman | F01D 5/182 | 416/97 R |
| 3,848,307 A * | 11/1974 | Kydd | B23P 15/04 | 29/889.721 |
| 3,856,433 A * | 12/1974 | Grondahl | F01D 5/185 | 416/97 R |
| 4,111,604 A * | 9/1978 | Kydd | F01D 5/185 | 416/92 |
| 4,142,824 A * | 3/1979 | Andersen | F01D 5/20 | 415/115 |
| 4,259,037 A * | 3/1981 | Anderson | F01D 5/185 | 416/92 |
| 4,473,336 A * | 9/1984 | Coney | B23P 15/04 | 416/223 A |
| 4,753,575 A * | 6/1988 | Levengood | F01D 5/187 | 415/115 |
| 5,660,524 A * | 8/1997 | Lee | F01D 5/182 | 415/115 |
| 5,733,102 A * | 3/1998 | Lee | F01D 5/20 | 416/97 R |
| 5,813,836 A * | 9/1998 | Starkweather | F01D 5/187 | 415/173.4 |
| 5,902,093 A * | 5/1999 | Liotta | F01D 5/20 | 415/115 |
| 5,927,946 A * | 7/1999 | Lee | F01D 5/20 | 415/115 |
| 6,126,396 A * | 10/2000 | Doughty | F01D 5/187 | 416/97 R |
| 6,773,230 B2 * | 8/2004 | Bather | F01D 5/186 | 415/115 |
| 6,916,150 B2 * | 7/2005 | Liang | F01D 5/186 | 415/115 |
| 6,971,851 B2 * | 12/2005 | Liang | F01D 5/08 | 416/1 |
| 7,029,235 B2 * | 4/2006 | Liang | F01D 5/18 | 416/232 |
| 7,108,479 B2 * | 9/2006 | Beverley | F01D 9/041 | 415/115 |
| 7,632,062 B2 * | 12/2009 | Harvey | F01D 5/20 | 415/115 |
| 7,997,865 B1 * | 8/2011 | Liang | F01D 5/20 | 416/92 |
| 8,157,505 B2 * | 4/2012 | Liang | F01D 5/187 | 415/173.1 |
| 8,182,221 B1 * | 5/2012 | Liang | F01D 5/087 | 415/115 |
| 8,366,394 B1 | 2/2013 | Liang | | |
| 8,500,401 B1 | 8/2013 | Liang | | |
| 2005/0244270 A1 * | 11/2005 | Liang | F01D 5/18 | 416/97 R |
| 2013/0315749 A1 | 11/2013 | Zhang | | |
| 2014/0044557 A1 | 2/2014 | Giglio et al. | | |

* cited by examiner

AIRFOIL COOLING CIRCUIT

FIELD

The present disclosure relates to airfoils such as rotor blades and/or stator vanes, and more specifically, to cooling circuits in airfoils.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Cooling air may be extracted from the compressor section and used to cool the gas path components. Cooled components may include, for example, rotating blades and stator vanes in the turbine section. One mechanism used to cool turbine airfoils includes utilizing internal cooling circuits and/or a baffle.

SUMMARY

In various embodiments, the present disclosure provides a an airfoil that includes an airfoil body. The airfoil body may define a skin chamber, a skin chamber outlet opening, and a tip flag chamber. In various embodiments, the skin chamber is in fluidic communication with the tip flag chamber via the skin chamber outlet opening. In various embodiments, the airfoil body further defines an outlet hole disposed on at least one of a trailing edge and a pressure side of the airfoil. The tip flag chamber may be in fluidic communication with the outlet hole (e.g., cooling circuit air in the tip flag chamber may exit the airfoil via the outlet hole). In various embodiments, the tip flag chamber extends parallel and directly adjacent to the outermost tip of the airfoil.

In various embodiments, the skin chamber outlet opening is disposed between the skin chamber and the tip flag chamber. In various embodiments, a majority of cooling circuit air in the skin chamber is configured to exit the airfoil via the skin chamber outlet opening, the tip flag chamber, and the outlet hole. In various embodiments, a radially outermost wall of the skin chamber is solid and is configured to prevent the cooling circuit air from radially exiting the skin chamber. In various embodiments, the skin chamber is a suction side skin chamber. In various embodiments, the skin chamber is a leading edge skin chamber. In various embodiments, the skin chamber is one of a plurality of skin chambers, the skin chamber outlet opening is one of a plurality of skin chamber outlet openings, and the outlet hole is one of a plurality of outlet holes. A cumulative cross-sectional area of the plurality of outlet holes may be less than 50% of a cumulative cross-sectional area of the plurality of skin chambers as measured at a radial span where a majority of the plurality of skin chamber outlet openings are located. The airfoil may be an airfoil of a gas turbine engine.

Also disclosed herein, according to various embodiments, is a method of manufacturing an airfoil. The method may include interconnecting a skin core with a tip flag core via a core tie to define a skin chamber outlet opening and defining an outlet hole of a tip flag chamber disposed on at least one of a trailing edge and a pressure side of the airfoil. In various embodiments, the tip flag core extends substantially perpendicular to the skin core. In various embodiments, the tip flag core extends parallel and directly adjacent to a radially outermost tip of the airfoil. In various embodiments, the skin core is a suction side skin core. In various embodiments, the skin core is a leading edge skin core.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
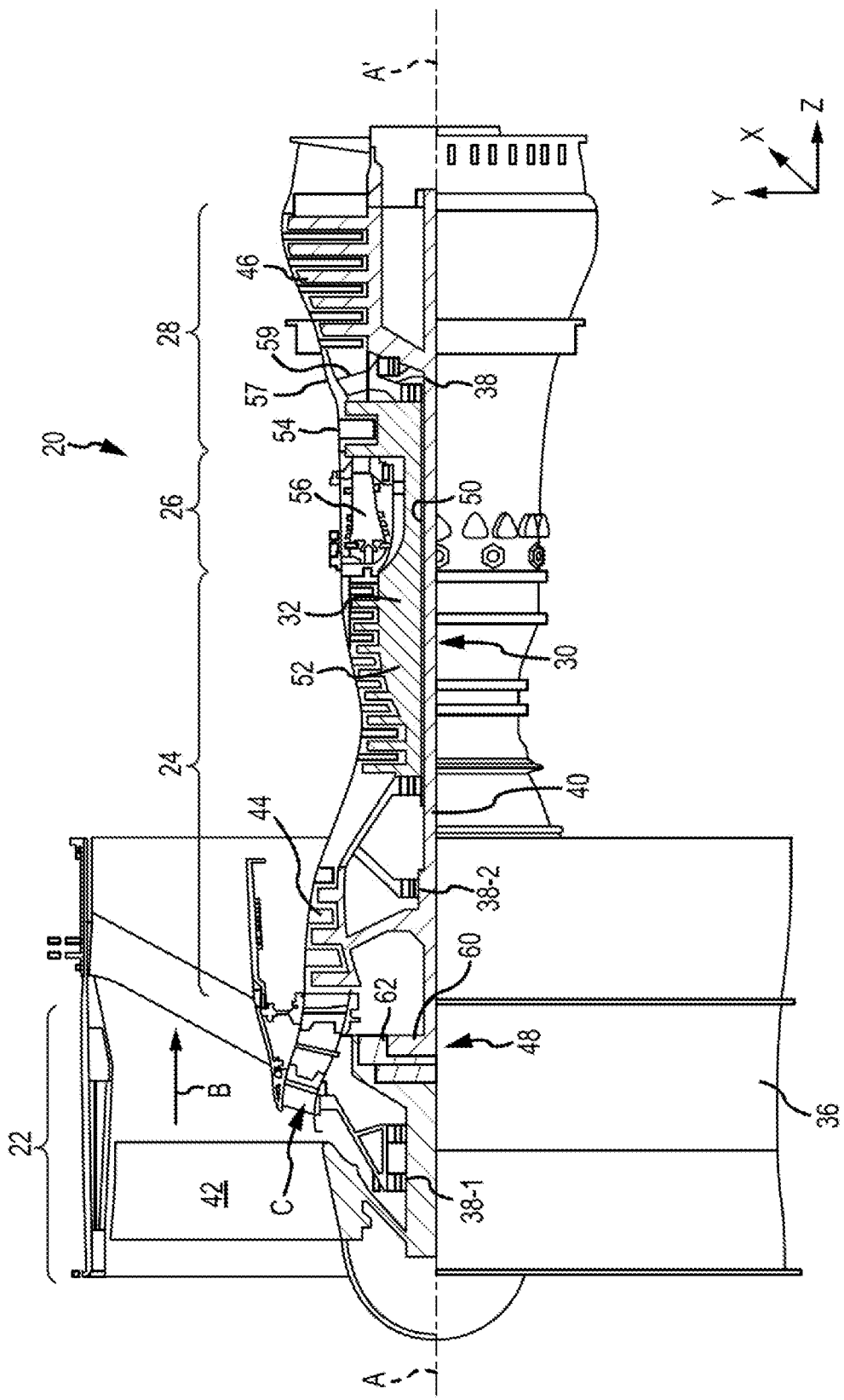
FIG. 1 is a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, a cooling circuit configuration for an airfoil is disclosed herein. Generally, the present disclosure provides an outlet flow pathway for cooling circuit air from one or more skin chambers of a hybrid airfoil via a tip flag chamber, according to various embodiments. In various embodiments, and as described in greater detail below, cooling circuit air may be configured to flow out from one or more skin chambers, into a tip flag chamber, and exit the airfoil via outlets disposed along a trailing edge or pressure side of the airfoil. That is, for example, a majority of cooling circuit air flowing through suction side skin chambers of a hybrid airfoil may be directed to exit the airfoil via trailing edge or pressure side outlets of the tip flag chamber instead of through suction side film holes or radially outward facing outlets, according to various embodiments. This exit flow configuration for purging the cooling circuit air mitigates aerodynamic mixing losses associated with conventional purging configurations and may improve the ability, capacity, and/or efficiency of cooling the airfoil. While numerous details are included herein pertaining to airfoils in gas turbine engines, such as rotor blades and stator vanes, the scope of the present disclosure is not necessarily limited to airfoils of gas turbine engines. That is, the cooling circuit configuration provided herein may be utilized with internally cooled components in other applications.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that the first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component. Said differently, the term "axial" generally refers to a position along the "z" axis of the xyz axes provided in the figures (e.g., along the longitudinal center of the gas turbine engine).

As used herein, a first component that is "radially outward" of a second component means that the first component is positioned at a greater distance away from an axis, such as an axis of rotation for rotors (e.g., an engine central longitudinal axis of a gas turbine engine), than the second component. Correspondingly, a first component that is "radially inward" of a second component means that the first component is positioned closer to the axis, such as the axis of rotation (e.g., the engine central longitudinal axis of a gas turbine), than the second component. In the case of components that rotate circumferentially about the engine central longitudinal axis, a first component that is radially inward of a second component rotates through a circumferentially shorter path than the second component. Said differently, the term "radial" generally refers to a position along the "y" axis of the xyz axes provided in the figures.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction (axial direction) on the provided xyz axis. The y direction on the provided xyz axis refers to radial directions. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 and then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
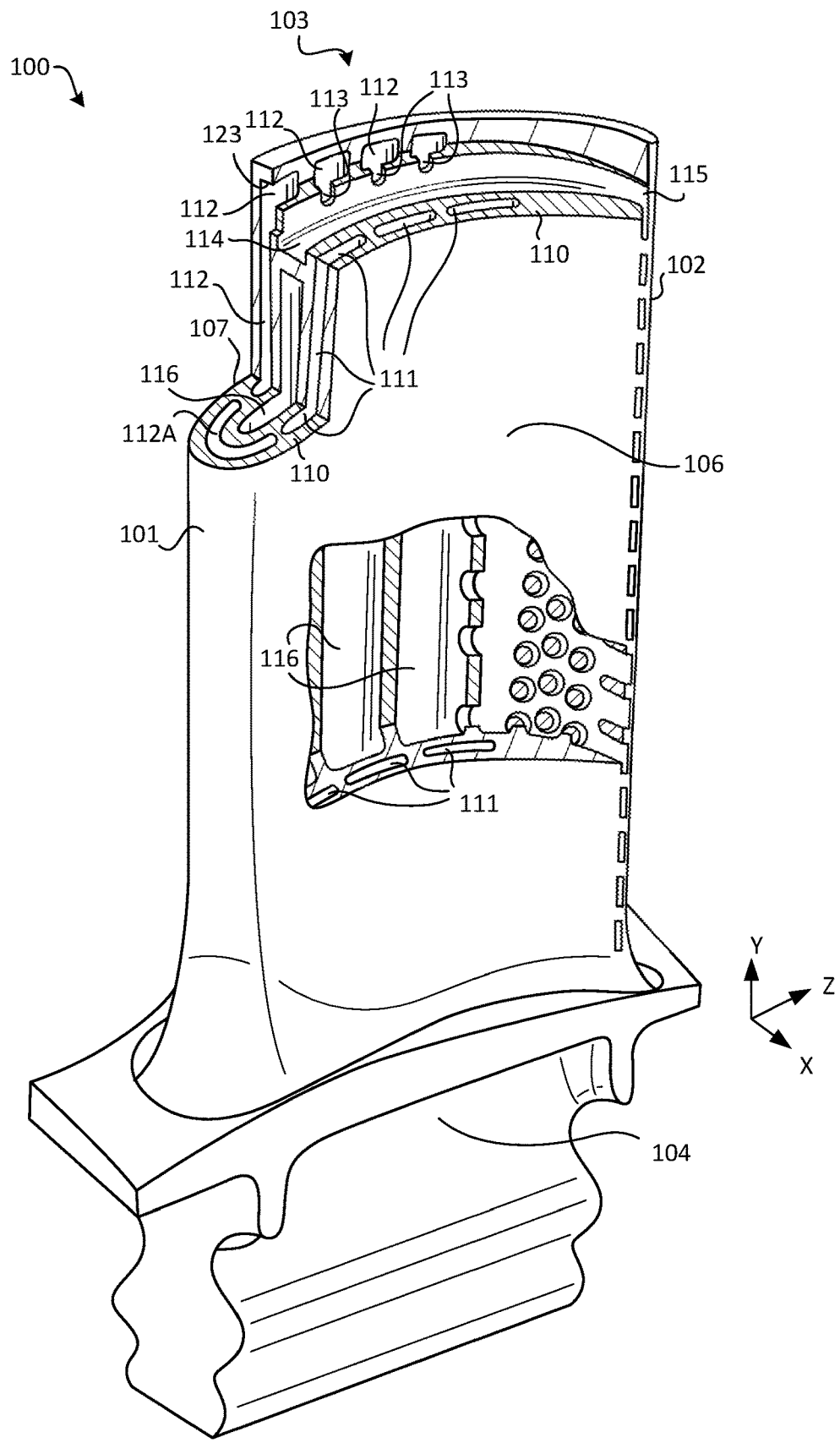
FIG. 2 is a perspective, partial cutaway view of an airfoil, in accordance with various embodiments.
Figure 3A:
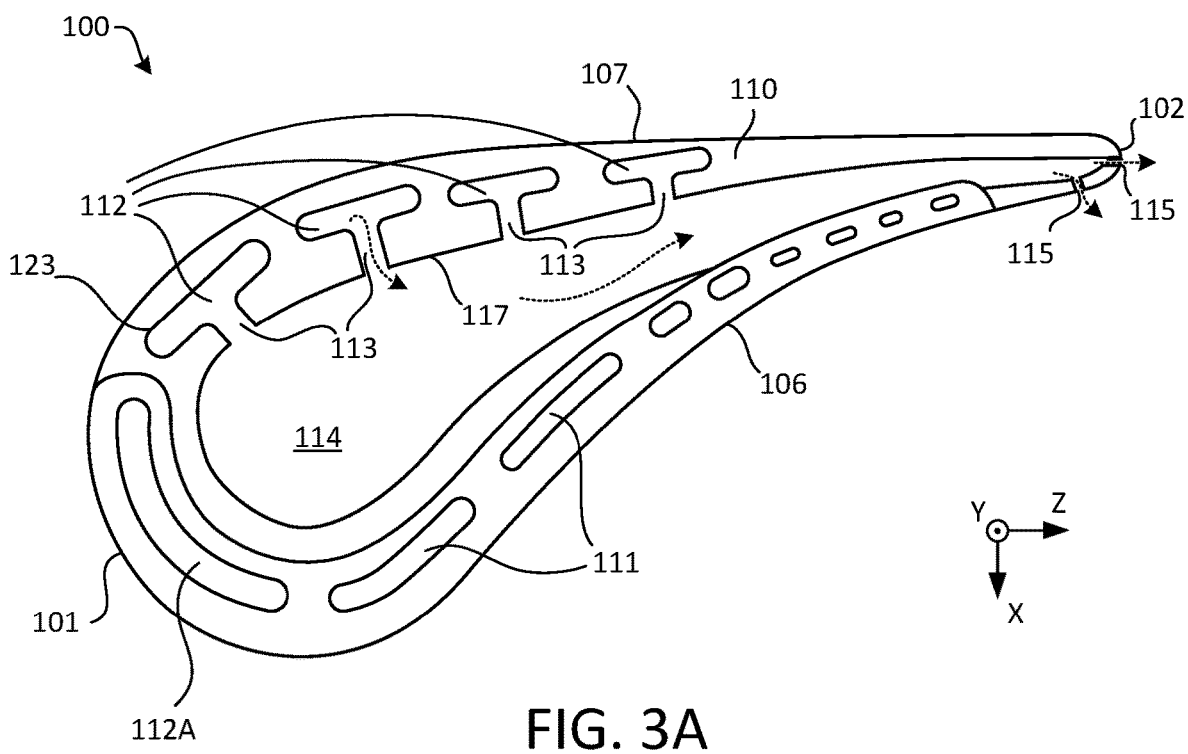
FIG. 3A is a cross-sectional view of a tip portion of an airfoil, in accordance with various embodiments.
Figure 3B:
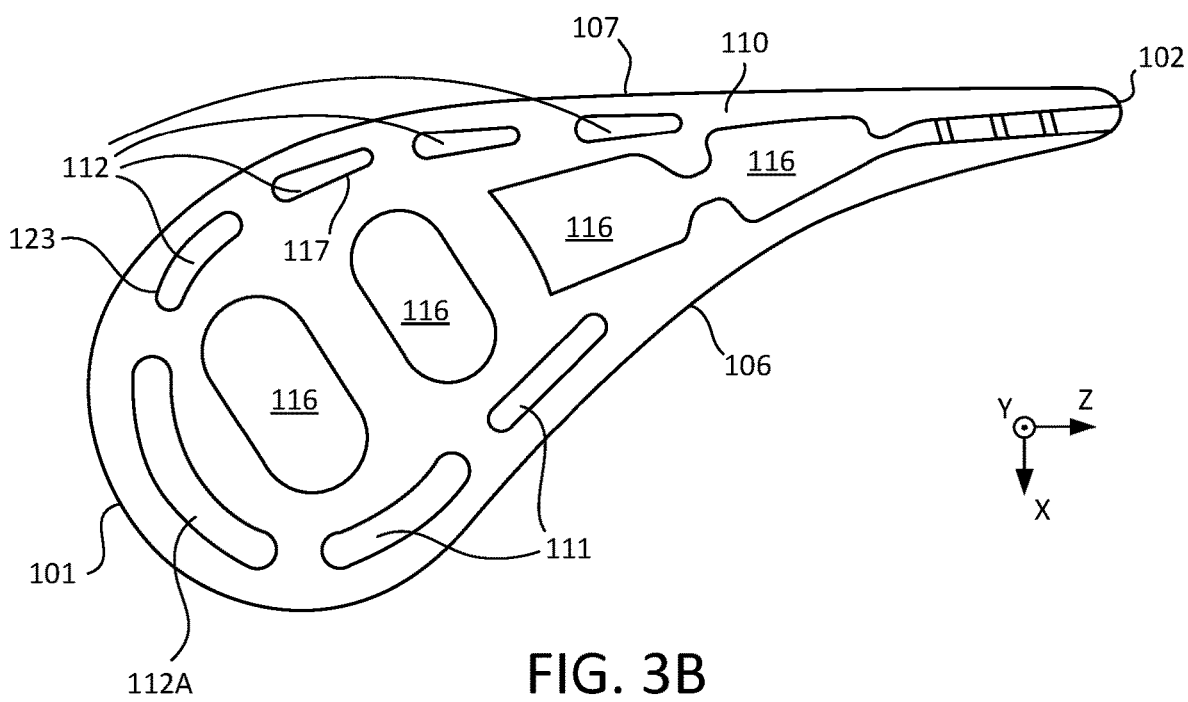
FIG. 3B is a cross-sectional view of a mid-span portion of an airfoil, in accordance with various embodiments.

Airfoils, such as rotor blades and stator vanes, are often utilized in various sections of gas turbine engines to direct, condition, and affect the flow of fluids (e.g., air and/or combustion gases) through the gas turbine engine. With reference to FIGS. 2, 3A, and 3B, an airfoil 100 having an airfoil body 110 is disclosed. The airfoil 100 generally includes a hub end 104 for attaching the airfoil 100, for example, to a disk of a rotor system. The airfoil 100 may also have a radially outer edge or tip 103 located radially outward from the hub end 104. The airfoil 100 may have a leading edge 101 opposite a trailing edge 102. In various embodiments, the airfoil 100 may further include a generally concave pressure surface 106 and a generally convex suction 107 surface joined together at the respective leading edge 101 and trailing edge 102. The airfoil 100 may be curved and twisted relative to, for example, a plane extending radially from the rotor disk, in terms of the overall geometry of the airfoil 100.

It will be noted that airfoils for gas turbine engines may be provided in a variety of sizes, shapes, and geometries. Accordingly, the airfoil 100 of the present disclosure is not limited to the specific geometry, size, and shape shown in the figures. Further, as mentioned above, the disclosed airfoil 100 is not necessarily limited to the fan section 22 of a gas turbine engine 20, but instead may be implemented in other sections of the gas turbine engine 20 and/or may be adapted for use in other types of jet engines, propellers, rotors, etc. In various embodiments, the body 110 of the airfoil 100 may be fabricated from a metallic material, such as a metal and/or a metal alloy. In various embodiments, for example, the body 110 of the airfoil 100 may be fabricated from aluminum, an aluminum alloy, titanium, and/or a titanium alloy, among other suitable metallic materials. Additional details pertaining to the materials and methods of manufacture of the airfoil 100 are included below with reference to FIG. 4.

In various embodiments, the airfoil body 110 generally includes the structure, ribs, and/or walls that direct the cooling airflow through the airfoil 100. Thus, the airfoil body 110 generally includes the material that defines the chambers and flow passages that constitute the cooling circuit. In various embodiments, the airfoil 100 is a hybrid airfoil that includes one or more skin chambers 111, 112, 112A and one or more embedded, central chambers 116. That is, the airfoil body 110 may include an external wall structure and an internal wall structure. Generally, the external wall structure includes the portions, segments, and/or sections of the airfoil body 110 that are adjacent to the external airfoil surface while the internal wall structure generally includes the portions, segments, and/or sections of the airfoil body 110 that are disposed within and extend between the external wall structure. Said differently, the external wall structure may be referred to as hot-side walls and/or hot-side surfaces because the external wall structure is adjacent to, and may directly abut, the external airfoil surface and thus may be closer to the high temperature combustion gases passing over and around the airfoil 100. The internal wall structure may be referred to as cool-side walls and/or cool-side surfaces because the internal wall structure is nearer to the center of airfoil 100 than the external wall structure and thus is further removed from the hot combustion gases.

In various embodiments, the skin chambers 111, 112, 112A refer to the flow passages that are at least partially defined/formed by the external wall structure while the central chamber(s) 116 may be entirely defined by the internal wall structure and thus may not be defined by the external wall structure. In various embodiments, skin chambers 111, 112, 112A may be disposed around the central chamber(s) 116. Accordingly, the sections of the internal wall structure that define the central chamber(s) 116 may be cool-side walls that are not adjacent the external airfoil surface and thus do not interface with the hot combustion gases under nominal operating conditions. In various embodiments, the airfoil body 110 includes heat transfer augmentation features that are configured to improve convective heat transfer and thus improve the cooling ability of the cooling circuit air flowing within the flow passages. The heat transfer augmentation features may include an array of trip strips, protrusions, dimples, recesses, turbulators, pin fins, pedestals, and other suitable cooling features. In various embodiments, the airfoil body 110 may include film holes. The film holes may be configured to produce a layer of cooling air that flows over the surface(s) of the airfoil 100 to protect the airfoil from exposure to the high temperature combustion gases.

The airfoil body 110 may define various types of skin chambers depending on their relative position within the airfoil. For example, the airfoil body 110 may define suction side skin chambers 112, leading edge skin chambers 112A, and pressure side skin chambers 111. Generally, the cooling circuit of the disclosed airfoil 100 provides a pathway for directing cooling circuit air from a suction side skin chamber 112 or a leading edge skin chamber 112A into a tip flag chamber 114. The tip flag chamber 114 may be defined by the airfoil body 110 and may extend substantially perpendicular to the skin chambers 112. In various embodiments, the tip flag chamber 114 extends parallel to and directly adjacent to a radially outermost tip 103 of the airfoil 100. The skin chamber 112 may be in fluidic communication with the tip flag chamber 114 via the one or more skin chamber outlet openings 113. The skin chamber outlet openings 113 may be formed in an inner wall structure between the skin chamber 112 and the tip flag chamber 114. The airfoil body 110 may further include one or more outlet holes 115 disposed on (e.g., formed in) the trailing edge 102 or the pressure side 106 of the airfoil, and the tip flag chamber 114 may be in fluidic communication with the outlet hole 115.

Generally, a majority of the cooling circuit air flowing through the skin chamber 112 is configured to flow out of the airfoil 100 via the skin chamber outlet opening 113, the tip flag chamber 114, and the outlet hole 115, as indicated by the arrows in FIG. 3A. Said differently, more than half of the flow of cooling circuit air flowing through the skin chamber 112 is configured to exit the skin chamber 112 via the indicated route, according to various embodiments. In various embodiments, more than 75% of the flow of cooling circuit air in the skin chamber 112 is configured to exit the skin chamber 112 via the indicated route. The skin chamber outlet openings 113 may be implemented in addition to, or instead of, film holes/outlets formed in a radially outermost wall 123 (FIG. 2) of the skin chamber 112. Said differently, the skin chamber outlet openings 113 may provide an alternative, when compared with conventional airfoils, exit route for the cooling circuit air in the skin chamber 112 (i.e., via the tip flag chamber 114).

In various embodiments, the outlet holes 115 are positioned to direct the exiting flow aft and/or towards the pressure side 106 of the airfoil 100. By directing at least a majority portion of the exit flow of cooling circuit air away from the suction side 107 of the airfoil 100, the aerodynamic mixing loss is reduced. In other words, the configuration of the cooling circuit described herein enables sufficient cooling circuit air to flow through the suction side skin chambers 112 or leading edge skin chambers 112A while reducing the aerodynamic mixing losses that would occur if the cooling circuit air in the skin chamber 112 were to be exclusively purged via conventional suction side film holes or outlet openings formed in the radially outermost wall 123 of the skin chambers 112 themselves. In various embodiments, the radially outermost wall 123 of the skin chamber 112 is solid and does not have any holes, openings, or apertures, thereby preventing the cooling circuit air from directly radially exiting the skin chambers 112. That is, the radially outermost wall 123 of the skin chamber 112 may be free of film hole features or other openings/holes that radially direct cooling circuit air directly out of the airfoil 100. In various embodiments, a radially extending wall 117 is disposed between the skin chamber 112 and the tip flag chamber 114.

In various embodiments, a cumulative cross-sectional area of the plurality of outlet holes 115 is less than 50% of a cumulative cross-sectional area of the plurality of skin chambers 112 as measured at a radial span where a majority of the plurality of skin chamber outlet openings 113 are located. For example, at 90% span (e.g., at the radial position that is 90% of the distance from the root to the tip of the airfoil 100), the cumulative cross-sectional area of the plurality of skin chambers 112 is more than twice the cumulative cross-sectional area of the plurality of outlet holes 115. In various embodiments, as shown in FIGS. 2 and 3B, the skin chambers 112 may not be in substantial fluidic communication with the central chamber(s) 116. Thus, according to various embodiments, the only substantial crossover flow from the skin chamber 112 is via the skin chamber outlet opening 113 near the tip portion of the airfoil where the tip flag chamber 114 is located.

Figure 4:
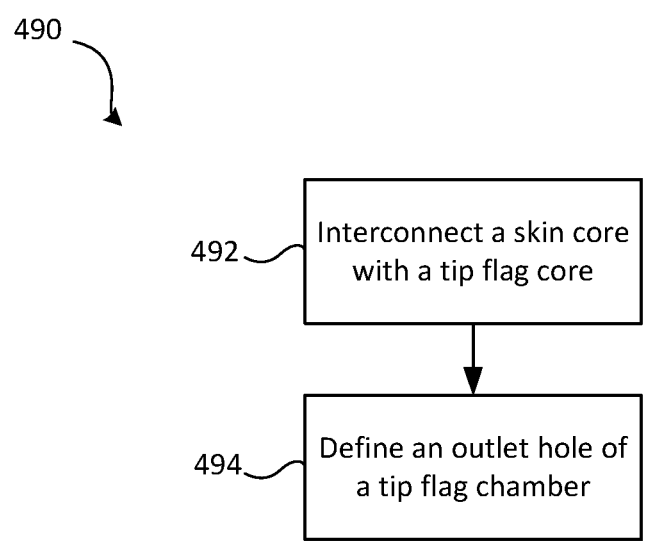
FIG. 4 is a schematic flow chart diagram of a method of manufacturing an airfoil, in accordance with various embodiments.

In various embodiments, and with reference to FIG. 4, a method 490 of manufacturing an airfoil is provided. The method 490 may include interconnecting a skin core with a tip flag core at step 492 and defining an outlet hole of a tip flag chamber at step 494. In various embodiments, the airfoil body 110 of the airfoil 100 may be formed via a casting process, a core die technique, an additive manufacturing technique, a lost wax process, or an investment casting process, among other suitable processes. Step 492, for example, may include interconnecting the skin core with a tip flag core via one or more core ties. A core tie is a manufacturing artifact caused by a structure used to connect between the cooling channels during the casting process to join different casting structures together, reducing undesirable movement and part breakage during the manufacturing process. The core ties that may be used during step 492 may be shaped and sized to form the skin chamber outlet opening(s) that enable fluidic communication between the skin chamber 112 (formed by the skin core) and the tip flag chamber 114 (formed by the tip flag core). In various embodiments, step 494 of defining the outlet hole(s) of a tip flag chamber disposed on the trailing edge and/or the pressure side of the airfoil may be performed after step 492 and/or after the casting process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil comprising:
    an airfoil body, wherein the airfoil body defines:
        a central chamber;
        a plurality of skin chambers disposed between the central chamber and an external airfoil surface;
        a tip end of the airfoil and a root end of the airfoil, wherein the tip end extends radially from the root end;
        a tip flag chamber;
        a plurality of outlet holes disposed on a trailing edge of the airfoil, wherein the tip flag chamber is in fluidic communication with a first outlet hole of the plurality of outlet holes; and
        a radially extending wall between the plurality of skin chambers and the tip flag chamber, wherein a plurality of skin chamber outlet openings is defined in the radially extending wall;
        wherein at a first radial position that is at least one of 90% or greater than 90% of the distance from the root end to the tip end of the airfoil, the plurality of skin chambers is in fluidic communication with the tip flag chamber via the plurality of skin chamber outlet openings and a cumulative cross-sectional area of the plurality of skin chambers is greater than twice a cumulative cross-sectional area of the plurality of outlet holes;
        wherein the tip flag chamber is radially outward of the central chamber;
        wherein at a second radial position of less than 50% of the distance from the root end to the tip end of the airfoil, the plurality of skin chambers is fluidically isolated from the central chamber; and
        wherein the airfoil is configured to direct a majority of cooling circuit air in the plurality of skin chambers to exit the airfoil via the plurality of skin chamber outlet openings, the tip flag chamber, and the first outlet hole, wherein at least a portion of the majority of cooling circuit air exits the tip flag chamber via the first outlet hole.

2. The airfoil of claim 1, wherein the central chamber is entirely defined by an internal wall structure.

3. The airfoil of claim 2, wherein the tip flag chamber extends parallel and directly adjacent to a radially outermost tip of the airfoil, wherein the tip flag chamber is disposed between the central chamber and the radially outermost tip of the airfoil, and the plurality of skin chambers is located between the tip flag chamber and the external airfoil surface.

4. The airfoil of claim 1, wherein a radially outermost wall of the plurality of skin chambers is solid and is configured to prevent the cooling circuit air from radially exiting the plurality of skin chambers.

5. The airfoil of claim 3, wherein each of the plurality of skin chambers is a suction side skin chamber.

6. The airfoil of claim 3, wherein each of the plurality of skin chambers is a leading edge skin chamber.

7. The airfoil of claim 3, wherein the cumulative cross-sectional area of the plurality of outlet holes is less than 50% of the cumulative cross-sectional area of the plurality of skin chambers as measured at a radial span where a majority of the plurality of skin chamber outlet openings are located.

8. A gas turbine engine comprising:
    an airfoil comprising an airfoil body, wherein the airfoil body defines:
        a central chamber;
        a plurality of skin chambers disposed between the central chamber and an external airfoil surface;
        a tip end of the airfoil and a root end of the airfoil, wherein the tip end extends radially from the root end;
        a plurality of skin chamber outlet openings defined in a radially extending wall;
        a tip flag chamber extending parallel to, directly adjacent to, and radially inward of a radially outermost tip of the airfoil; and
        a plurality of outlet holes disposed on a trailing edge of the airfoil, wherein the tip flag chamber is in fluidic communication with a first outlet hole of the plurality of outlet holes;
        wherein at a first radial position that is at least one of 90% or greater than 90% of the distance from the root end to the tip end of the airfoil, the plurality of skin chambers is in fluidic communication with the tip flag chamber via the plurality of skin chamber outlet openings defined in the radially extending wall, and a cumulative cross-sectional area of the plurality of skin chambers is greater than twice a cumulative cross-sectional area of the plurality of outlet holes;
        wherein the radially extending wall is disposed between the plurality of skin chambers and the tip flag chamber;
        wherein at a second radial position of less than 50% of the distance from the root end to the tip end of the airfoil, the plurality of skin chambers is in fluidic isolation from the central chamber;
        a radially outermost wall of the plurality of skin chambers is solid and is configured to prevent cooling circuit air from radially exiting the plurality of skin chambers, and at least a portion of the cooling circuit air exits the tip flag chamber via the first outlet hole; and
        the airfoil is configured to direct a majority of cooling circuit air in the plurality of skin chambers to exit the airfoil via the plurality of skin chamber outlet openings, the tip flag chamber, and the first outlet hole.

9. The gas turbine engine of claim 8, wherein the tip flag chamber is radially outward of the central chamber, and the plurality of skin chambers is located between the tip flag chamber and the external airfoil surface.

10. The gas turbine engine of claim 8, wherein the tip flag chamber is radially inward of the radially outermost tip of the airfoil such that the radially extending wall is an internal wall structure of the airfoil.

11. The gas turbine engine of claim 8, wherein the cumulative cross-sectional area of the plurality of outlet holes is less than 50% of the cumulative cross-sectional area of the plurality of skin chambers as measured at a radial span where a majority of the plurality of skin chamber outlet openings are located.

12. A method of manufacturing an airfoil, the method comprising:
    interconnecting a plurality of skin cores with a tip flag core via a plurality of core ties to define a plurality of skin chamber outlet openings in a radially extending wall between the tip flag core and the plurality of skin cores, wherein the radially extending wall is an internal wall structure, wherein the tip flag core is disposed radially outward of a central chamber core, wherein the airfoil comprises a tip end of the airfoil and a root end of the airfoil, wherein the tip end extends radially from the root end, wherein at a first radial position that is at least one of 90% or greater than 90% of the distance from the root end to the tip end of the airfoil, the plurality of skin cores is in fluidic communication with the tip flag core via the plurality of skin chamber outlet openings; and defining a plurality of outlet holes disposed on a trailing edge of the airfoil, wherein the tip flag core is in fluidic communication with a first outlet hole of the plurality of outlet holes;

wherein a cumulative cross-sectional area of the plurality of skin cores is greater than twice a cumulative cross-sectional area of the plurality of outlet holes, and wherein at a second radial position of less than 50% of the distance from the root end to the tip end of the airfoil, the plurality of skin cores is in fluidic isolation from the central chamber core, and a cooling circuit air exits the tip flag core via the first outlet hole; and the airfoil is configured to direct a majority of cooling circuit air in the plurality of skin cores to exit the airfoil via the plurality of skin chamber outlet openings, the tip flag core, and the first outlet hole.

13. The method of claim 12, wherein the tip flag core extends substantially perpendicular to the plurality of skin cores.

14. The method of claim 12, wherein the tip flag core extends parallel and directly adjacent to a radially outermost tip of the airfoil, and the plurality of skin cores is located between the tip flag core and an external airfoil surface.

15. The method of claim 12, wherein a radially outermost side of the plurality of skin cores is free of film hole features.

16. The method of claim 12, wherein each of the plurality of skin cores is a suction side skin core.

17. The airfoil of claim 1, wherein the tip flag chamber is directly and entirely radially outward of the plurality of skin chambers.

18. The airfoil of claim 1, wherein the wall is a first wall that is radially aligned with a second wall, wherein the second wall is radially inward of the first wall, wherein the second wall extends radially between the plurality of skin chambers and the central chamber.

19. The airfoil of claim 1, wherein:
the airfoil body comprises an external wall structure and internal wall structure, wherein the external wall structure comprises wall portions of the airfoil body that are adjacent to the external airfoil surface;
the internal wall structure comprises wall portions of the airfoil body that are disposed within and extend between the external wall structure; and
wherein the wall is a section of the internal wall structure.

* * * * *